United States Patent [19]

Johnson

[11] Patent Number: 5,383,966
[45] Date of Patent: Jan. 24, 1995

[54] PROCESS FOR THE PREPARATION OF DISPERSIBLE QUINACRIDONES

[75] Inventor: Daphne R. Johnson, Charleston, S.C.

[73] Assignee: Miles Inc., Pittsburgh, Pa.

[21] Appl. No.: 121,816

[22] Filed: Sep. 15, 1993

Related U.S. Application Data

[63] Continuation-in-part of Ser. No. 996,245, Dec. 23, 1992, abandoned.

[51] Int. Cl.$^6$ .............................................. C09B 48/00
[52] U.S. Cl. ...................... 106/495; 546/56; 106/497; 106/504; 106/505; 106/20 R
[58] Field of Search ................ 106/20 R, 493-497, 106/499, 500, 505, 504; 546/56

[56] References Cited

U.S. PATENT DOCUMENTS

| | | | |
|---|---|---|---|
| 2,857,400 | 10/1958 | Cooper | 260/246 |
| 3,017,414 | 1/1962 | Minnich et al. | 260/279 |
| 3,256,285 | 6/1966 | Fuchs et al. | 260/279 |
| 3,287,147 | 11/1966 | Wilkinson | 106/288 |
| 3,317,539 | 5/1967 | Jaffe | 260/279 |
| 4,094,699 | 6/1978 | Fitzgerald | 106/288 Q |
| 4,298,398 | 11/1981 | Fitzgerald | 106/288 Q |
| 4,455,173 | 6/1984 | Jaffe | 106/288 Q |
| 4,541,872 | 9/1985 | Jaffe | 106/309 |
| 4,895,948 | 1/1990 | Jaffe et al. | 546/56 |
| 4,969,954 | 11/1990 | Schütze et al. | 106/493 |
| 5,078,954 | 1/1992 | Schütze et al. | 106/493 |
| 5,084,563 | 1/1992 | Bäbler et al. | 106/495 |
| 5,095,056 | 3/1992 | Bäbler et al. | 524/90 |

FOREIGN PATENT DOCUMENTS 955854 4/1964 United Kingdom .

OTHER PUBLICATIONS

Hawley's Chemical Dictionary, Sax and Lewis, Jr., 1987, p. 86.*
S. S. Labana & L. L. Labana, "Quinacridones," Chemical Reviews, 67, 1–18 *(1967).
K. Merkle & H. Schäfer, "Surface Treatment of Organic Pigments" in Pigment Handbook, vol. 111 (New York: John Wiley & Sons, Inc. *1973) p. 157.
R. B. McKay, "The Development of Organic Pigments with Particular Reference to Physical Form and Consequent Behavior in Use" in Rev. Prog. Coloration, 10, 25–32 (*1979).
R. B. McKay, "Control of the application performance of classical organic pigments" in JOCCA, 89–93 *(1989).
T. B. Reeve and W. L. Dills, "Pigment Dispersions and Rheology in Plastics," Pigment Handbook, *1973.
T. A. Langstroth, "Pigment Flushing" in Pigment Handbook, vol. 111 (New York: John Wiley & Sons, . . . 441–446 and 447–455, *1973.

Primary Examiner—Paul Lieberman
Assistant Examiner—Margaret Einsmann
Attorney, Agent, or Firm—Joseph C. Gil; Richard E. L. Henderson

[57] ABSTRACT

The present invention relates to a process for conditioning quinacridone pigments by
(a) preparing an aqueous slurry of a crude quinacridone;
(b) thoroughly mixing the aqueous slurry with about 0.3 to about 2.9 parts by weight, relative to the quinacridone, of at least one $C_1$–$C_{12}$ alkyl ester of a $C_7$–$C_{12}$ aromatic carboxylic acid at a temperature of between about 70° C. and about 200° C.;
(c) hydrolyzing the alkyl ester used in step (b); and
(d) collecting the quinacridone pigment.

22 Claims, No Drawings

PROCESS FOR THE PREPARATION OF DISPERSIBLE QUINACRIDONES

This application is a continuation-in-part of application Ser. No. 07/996,245 filed Dec. 23,1992, now abandoned.

BACKGROUND OF THE INVENTION

The present invention relates to a new finishing process for quinacridones, quinacridone derivatives, and solid solutions thereof and to their use for the pigmentation of, for example, fibers, plastics, coatings, and printing inks. More particularly, this invention relates to the heat treatment of quinacridone, quinacridone derivatives, and solid solutions thereof, in low concentrations of an organic ester.

Processes for the preparation of quinacridones are well known. For example, S. S. Labana and L. L. Labana, "Quinacridones" in *Chemical Reviews*, 67, 1–18 (1967); U.S. Pat. Nos. 3,256,285; and 3,317,539). The quinacridones initially formed in such processes, often referred to as crude quinacridones, are generally unsuitable for use as pigments and must be subjected to one or more additional finishing steps that modify particle size, particle shape, and/or crystal structure in such a way that provides good igmentary quality it is well known that pigmentary properties depend not just on chemical structure but also depend on crystal form, crystal modification, and the surface nature of pigment crystals. See, for example, K. Merkle and H. Schäfer, "Surface Treatment of Organic Pigments" in *Pigment Handbook*, Vol. III (New York: John Wiley & Sons, Inc., 1973), page 157; R. B. McKay, "The Development of Organic Pigments with Particular Reference to Physical Form and Consequent Behavior in Use" in *Rev. Proq. Coloration*, 10, 25–32 (1979); and R. B. KcKay, "Control of the application performance of classical organic pigments" in *JOCCA*, 89–93 (1989). Some pigments, such as dianthraquinonyl pigments (which, unlike quinacridones, have only one crystal form) can be obtained in pigmentary form with or without finishing steps. E.g., U.S. Pat. Nos. 4,969,954 and 5,078,794. However, such is not the case for pigments such as quinacridones and phthalocyanines.

Although a number of suitable conditioning methods are known to those skilled in the art, the most commonly used methods involve milling the dried crude quinacridone, most commonly in the presence of undesirably large amounts of an inorganic salt that must subsequently be removed. Pigmentary quinacridones can also be obtained by first premilling the dried crude material and then treating the milled material with an organic liquid. Other methods involve a premilling step followed by another milling step using water and small amounts of an organic liquid. Pigmentary quinacridones can also be obtained by heat treatment of crude presscake in large quantities of solvent. Additives have been added during the milling or solvent treatment steps to further improve pigment properties.

When using organic solvents for conditioning a pigment, the water that is present in presscakes and the air that is present in powders is replaced by the solvent, a process known as "wetting out." Because of the differences in physical properties, different types of pigments react differently to the wetting-out process. See, for example, T. B. Reeve and W. L. Dills, "Pigment Dispersions and Rheology in Plastics," and T. A. Langstroth, "Pigment Flushing" in *Pigment Handbook*, Vol. III (New York: John Wiley & Sons, Inc., 1973), pages 441–446, and 447–455, respectively. It is often necessary to aid the wetting-out process by using surface-active agents, but even here the differences in the pigments affects the selection of surface-active agents. Therefore, many methods have been reported for the finishing of quinacridone pigments with organic solvents.

For example, U.S. Pat. No. 2,857,400 discloses a method in which a crude pigment is milled in the dry state and then agitated in an organic liquid. U.S. Pat. No. 3,017,414 discloses a method in which crude pigment is premilled in a ball mill and then treated with an emulsion of water and certain specified organic liquids in the presence of a small amount of a surfactant. U.S. Pat. No. 4,094,699 discloses the treatment of a premilled crude quinacridone with an aqueous alkaline solution containing surfactants. U.S. Pat. No. 4,298,398 discloses a similar method in which a premilled crude quinacridone is treated in an aqueous alkaline solution containing cedain quaternary ammonium compounds. U.S. Pat. No. 3,287,147 discloses a process in which crude quinacridone is prepared in a finely divided or crystalline form (e.g., by either acid pasting or ball milling) and then converted to a neutral aqueous paste that is heated at 150° C. to 300° C under pressure using special equipment. U.S. Pat. No 4,455,173 discloses a process in which crude quinacridone pigments are acid pasted or ball milled and then milled in an organic liquid, preferably in the presence of a 2-phthalimidomethylquinacddone particle-size growth inhibitor. U.S. Patent No. 5,084,100 discloses a method in which crude quinacridone is ball milled in the presence of aluminum sulfate and esters of alkanedicarboxylic acids. U.S. Pat. No 4,541,872 discloses a method in which premilled crude quinacridone is ball milled in dilute aqueous base, an aqueous basic salt solution, or an aqueous solution of a base and a salt in the presence of a small amount of solvent, optionally in the presence of particle size growth promoters or inhibitors. Although these procedures give desirable results, they are generally time-consuming and relatively expensive.

Crude quinacridones can also be conditioned with organic solvents to give dispersible pigments. For example, U.S. Pat. No. 4,895,948 discloses a one-step finishing process in which a crude quinacridone is ball milled in an alcohol containing a base. U.S. Pat. No. 5,084,573 also discloses a one-step finishing process in which 2,9-dichloroquinacridone is stirred in heated polar organic solvents containing, as essential ingredients, cedain long-chain thiol compounds and a base. U.S. Pat. No. 5,095,056 discloses a process for conditioning 2,9-dichloroquinacridone using large quantities of polar solvents, including esters such as methyl benzoate, at temperatures above 50° C. Although bases and other such additional compounds are not required, the polar solvent is used in an amount that is about 3 to 20 times the weight of the pigment. Water can be tolerated but is not preferred. U.S. Pat. No. 3,256,285 similarly discloses a process for finishing aqueous pastes of quinacridones in large quantities of organic solvent (4 to 10 times the amount of pigment) at temperatures of 80° to 150° C. When using high-boiling or water-immiscible solvents (such as methyl benzoate and methyl salicylate) according to U.S. Pat. No. 3,256,285, the presscake must be washed with low boiling organic solvents, thus requiring the disposal of significant quantities of organic liquids. The present invention, in contrast, provides satisfactory results when aromatic esters are used as the organic solvent in quantities as small as 0.6 times the amount of quinacridone and without the need for special additives.

It was an object of the present invention to obtain high quality quinacridone pigments while avoiding the disadvantages of the known methods. The present invention unexpectedly provides an advantageous method for preparing such quinacridone pigments. First, it is not necessary to dry and grind the crude quinacridones before carrying out the finishing process of the invention, thereby reducing production time and costs. In addition, the organic solvents used in the process are esters that can be hydrolyzed to the constituent carboxylic acid and alcohol components. Because the hydrolysis products are water soluble, the pigment prepared according to the present invention need not be washed with an organic solvent. Because only small amounts of the organic ester solvent are required, the process of the present invention avoids the need to recover or recycle the solvent and reduces the amount of organic materials released into the environment. Finally, high quality pigments can be obtained even without using additives.

SUMMARY OF THE INVENTION

The present invention relates to a process for conditioning quinacridone pigments comprising
(a) preparing an aqueous slurry of a crude quinacridone;
(b) thoroughly mixing the aqueous slurry with about 0.3 to about 2.9 parts by weight (preferably 0.5 to 2.5 pads by weight and more preferably 0.5 to 1.5 parts by weight), relative to the quinacridone pigment, of at least one $C_1$–$C_{12}$ alkyl ester of a $C_7$–$C_{12}$ aromatic carboxylic acid at a temperature of between about 70° C. and about 200° C.;
(c) hydrolyzing the alkyl ester used in step (b); and
(d) collecting the quinacridone pigment.

The invention further relates to the use of such pigments in the pigmentation of fibers, plastics, coatings, printing inks, and the like.

DETAILED DESCRIPTION OF THE INVENTION

Quinacridones (by which is meant unsubstituted quinacridone, quinacridone derivatives, and solid solutions thereof) prepared by the finishing process of the present invention range from opaque to semi-opaque depending on the specific conditions used. The pigments have excellent light-fastness properties, are non-bleeding, and have excellent dispersibility and rheological properties.

As used herein, the term "crude quinacridone" refers to quinacridone and quinacridone derivatives as initially collected following chemical synthesis but not yet conditioned to improve pigmentary properties. Crude quinacridones are preferably unconditioned presscakes but can even include material in which padicle size has been manipulated (for example, by acid pasting, ball milling, and premilling) but which must still undergo additional conditioning to achieve pigmentary form. The term "crude quinacridone" as used herein also refers to quinacridone solid solutions prepared in situ during chemical synthesis using mixtures of the precursors of the individual quinacridones or prepared after chemical synthesis of each quinacridone component by dissolving a mixture of the crude components and then precipitating (but not conditioning) the resultant solid solution.

Suitable quinacridone derivatives include compounds having the formula

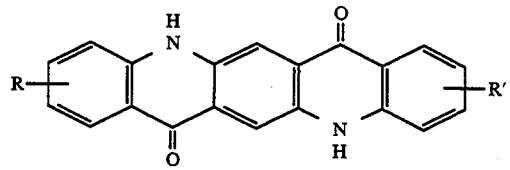

in which R and R' are independently halogen, $C_1$–$C_{12}$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, or $C_7$–$C_{16}$ aralkoxy or can represent ring-fused aromatic or heteroaromatic rings. As used herein, the term "$C_1$–$C_{12}$ alkyl" refers to straight or branched chain aliphatic hydrocarbon groups having from 1 to 12 carbon atoms. Examples of $C_1$–$C_{12}$ alkyl are methyl, ethyl, propyl, butyl, pentyl, hexyl, heptyl, octyl, nonyl, decyl, undecyl, dodecyl, and the isomeric forms thereof. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_5$–$C_7$ cydoalkyl" refers to cycloaliphatic hydrocarbon groups having from 5 to 7 carbon atoms. Examples of $C_5$–$C_7$ cycloalkyl are cyclopentyl, cyclohexyl, and cycloheptyl. The term "$C_5$–$C_7$ cycloalkoxy" refers to cycloalkyl oxy groups having from 5 to 7 carbon atoms. Examples of $C_5$–$C_7$ cycloalkoxy are cyclopentyloxy, cyclohexyloxy, and cycloheptyloxy. The term "$C_6$–$C_{10}$ aryl" refers to phenyl and 1- or 2-naphthyl. As used herein, the term "aryl" also refers to phenyl and naphthyl groups substituted with alkyl, alkoxy, halogen, cyano, and nitro as defined herein. The term "$C_6$–$C_{10}$ aryloxy" refers to phenoxy and 1- or 2-naphthoxy, in which the aryl podion can optionally be substituted as described above for "aryl." The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_1$–$C_{16}$ aralkyl are benzyl, phenethyl, and naphthyimethyl. The term "$C_7$–$C_{16}$ aralkoxy" refers to $C_1$–$C_6$ alkoxy substituted with $C_6$–$C_{10}$ aryl such that the total number of carbon atoms is from 7 to 16. An example of $C_7$–$C_{16}$ aralkoxy is benzyloxy. Examples of halogen are fluorine, chlorine, bromine, and iodine. Examples of suitable quinacridone derivatives include 2,9-dichloroquinacridone, 2,9-dimethylquinacridone, and 2,9-dimethoxyquinacridone, with 2,9-dichloroquinacridone and 2,9-dimethylquinacridone being preferred.

Solid solutions are compositions in which the molecules of two or more compounds enter into the same crystal lattice, usually (but not always) the crystal lattice characteristic of one of the components. The X-ray pattern of the resulting crystalline solid is characteristic and can be clearly differentiated from the pattern of a physical mixture of the same components in the same proportion. Suitable solid solutions according to the present invention contain two or more (preferably two) quinacridones, one of which can be unsubstituted quinacridone. Examples of suitable quinacridone solid solutions include compositions containing 99 to 1 percent by weight of 2,9-dichloroquinacridone and 1 to 99 percent by weight of unsubstituted quinacridone, with solid solutions containing 80 to 50 percent by weight of 2,9-dichloroquinacridone and 20 to 50 percent by weight of unsubstituted quinacridone being preferred.

Solid solutions of quinacridones can be prepared by any of several procedures known in the ad. For example, U.S. Pat. Nos. 3,160,510, 3,298,847, 3,607,336, 3,681,100, 4,099,980, and 4,895,949. Suitable procedures include (1) ring closing synthetic intermediates of the individual quinacridones, before or after oxidation, in strong acids or high boiling solvents, followed by precipitation, thereby forming the solid solution in situ, (2) dissolving the individual crude pigment components in strong mineral acids, such as sulfuric acid, followed by precipitation, and (3) milling the crude quinacridone components under cetain specified conditions. The present invention provides a method for preparing pigmentary solid solutions from crude material prepared by any of these methods.

Although the specific form of the crude quinacridone is not critical, presscake is generally preferred. Presscake containing about 4 to about 70 percent by weight (preferably 4 to 40 percent by weight) pigment, with the balance being essentially only water, is particularly preferred. Essentially anhydrous crude quinacridone, although less preferred because of the need to add water again in the slurrying step, is also suitable. Crude quinacridone containing larger quantities of water is, of course, also suitable, especially where handling is not hindered by the additional volume and weight involved. It is also possible to use forms of crude quinacridone in which particle size has been altered but which still require further conditioning.

In carrying out the process of the present invention, the crude quinacridone, preferably in presscake form, is first slurried in a sufficient amount of water to facilitate stirring. The precise amount of water required is somewhat dependent on the nature of the particular quinacridone, including its moisture content. In general, however, it has been found suitable to use about 4 to about 20 pads by weight (preferably 6 to 15 pads by weight) of water, based on the amount of the pigment contained in the crude material, with the amount of water including any water already present in the crude material.

About 0.3 to about 2.9 parts by weight (preferably 0.5 to 2.5 parts by weight and more preferably 0.5 to 1.5 pads by weight), based on the quinacridone pigment species contained in the crude material, of the desired aromatic ester solvent are then added to the aqueous slurry. Although larger amounts of solvents can be used, the use of the smaller amounts specified in the present invention reduces the costs associated with solvent recovery or recycling and reduces the amount of organic material released into the environment. Suitable organic finishing solvents include $C_1$-$C_{12}$ alkyl esters of $C_1$-$C_{12}$ aromatic monocarboxylic and/or dicarboxylic acids. Suitable aromatic monocarboxylic acids include benzoic acid and naphthoic acids and isomeric forms thereof, as well as aromatic ring-substituted derivatives in which the substituent can be, for example, alkyl, alkoxy, alkanoyl, halogen, hydroxy, amino, nitro, vinyl, and allyl groups. Suitable aromatic dicarboxylic acids include phthalic, isophthalic, terephthalic, and naphthalic acids and the isomeric forms thereof, as well as aromatic ring-substituted derivatives. Suitable $C_1$-$C_{12}$ alkyl groups include methyl, ethyl, propyl, butyl, pentyl, hexyl, heptyl, octyl, nonyl, decyl, undecyl, and dodecyl, and the isomeric forms thereof. Esters of dicarboxylic acids can contain two different alkyl groups, although esters having identical alkyl groups are preferred. Particularly preferred solvents include methyl benzoate, dimethyl salicylate, and dimethyl phthalate. Mixtures of such esters are, of course, also suitable. Esters of aromatic tricarboxylic and tetracarboxylic acids are suitable but less preferred. Esters of aliphatic monocarboxylic and dicarboxylic acids, on the other hand, are less suited for the finishing process.

The resultant aqueous-solvent slurry is thoroughly mixed (e.g., by vigorous stirring at temperatures between about 70° C. and about 200° C., preferably between 80° and 145° C.). Suitable apparatus for carrying out the process of the invention include stainless steel pressure vessels and other such equipment. For small scale preparations, a laboratory Parr reactor or other such apparatus is suitable. In general, temperatures below about 70° C. are less preferred because of a tendency to give less readily dispersed pigment. Temperatures above the specified range, on the other hand, tend to give "overcrystallized" particles having weaker color (although somewhat improved dispersibility may also result). Physical analyses by transmission electron microscopy of quinacridones conditioned with esters according to the invention show that temperature influences particle size. Thus, for example, conditioning at temperatures in the upper pad of the specified range generally yields visually larger particles and more opaque pigments than does conditioning at lower temperatures. Transmission electron microscopy also shows that conditioning according to the invention serves to break down aggregates formed during the chemical synthesis, thereby improving the dispersibility properties of the quinacridones.

Finishing must be carried out for a sufficient length of time to allow the particles to attain optimum pigmentary values. Although about two hours is sufficient, a period of about four to about eight hours is preferred. Longer times (for example, about twenty hours or even longer) generally provide only minor improvements in dispersibility and only minor changes in opacity.

Although it is possible in theory to remove the ester solvent by physical separation methods, it has been found difficult in practice to remove all (or essentially all) of the solvent by purely physical means. Therefore, it has been found particularly advantageous to hydrolyze the esters before collecting the pigment. Hydrolysis can be carried out, for example, by heating the solvent-containing finished pigment with a strongly alkaline solution (preferably an aqueous solution), such as aqueous sodium or potassium hydroxide. A particularly preferred hydrolysis method involves heating the solvent-containing pigment for about two hours at about 85° C. in about 4 to about 10% aqueous sodium hydroxide (prepared, for example, by adding 50% aqueous sodium hydroxide directly to the aqueous finishing mixture). Other hydrolysis methods known in the art are, of course, also suitable. The carboxylate and alcohol by-products formed during hydrolysis can then be removed, for example, during the separation step.

The finished pigment is collected by methods known in the art, preferably filtration, and then dried. Other collection methods known in the art, such as centrifugation, are suitable but generally less preferred. When the pigment is collected by filtration, the hydrolysis by-products can easily be removed when the pigment filter cake is washed, preferably with water. Although generally less preferred, it is also possible to collect pigment without first removing the carboxylate and/or alcohol by-products or after concomitant chemical precipitation of the carboxylate and/or alcohol. For example, a metal carboxylate salt can often provide advantageous surface properties that enhance pigmentary properties.

Because of their light stability and migration properties, the quinacridone pigments prepared according to the present invention are suitable for many different pigment applications. For example, pigments prepared according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polethylene and polypropylene; high molecular weight polyamides; polymers and copolymers of acrylates, methacrylates, acrylonitrile, acrylamide, butadiene, or styrene; polyurethanes; and polycarbonates. The materials pigmented with the quinacridone pigments of the present invention can have any desired shape or form.

The pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials such as polyvinyl chloride and ABS).

The following examples further illustrate details for the preparation and use of the pigments of this invention. The invention which is set forth in the foregoing disclosure is not to be limited either in spirit or scope by these examples. Those skilled in the art will readily understand that known variations of the conditions and processes of the following preparation procedures can be used to prepare these pigments. Unless otherwise noted, all temperatures are degrees Celsius and all parts and percentages are by weight.

EXAMPLES

Pigments prepared according to the Examples were analyzed by transmission electron microscopy using a Zeiss EM 109 instrument. Data were collected under the following conditions: Acceleration voltage: 80 kV

| Magnification | 1.0 micrometers |
|---|---|
| | 0.5 micrometers |
| | 0.2 micrometers |

Differences in hue and chroma were measured using an Applied Color System Spectral Sensor (Hunt Associated Laboratories, Fairfax, Virginia) or a MacBeth Xenon Flash (MacBeth Division of Kollmorgan, Newburgh, N.Y.).

Pigment dispersibilities were determined in either polyvinyl chloride ("PVC") or a PVC-based plastisol composed of 181.0 g of GEON 121 polyvinyl chloride (from B.F. Goodrich Chemical Co.), 107.3 g of diisooctyl phthalate, 9.0 g of PARAPLEX® G-62 plasticizer (from C. P. Hall Co.; PARAPLEX is a registered trademark of Rohm and Haas Company), 3.6 g of MARK® LL stabilizer (from Witco Corporation), and 12.3 g of a 25% titanium oxide paste in diisooctyl phthalate. Pigments prepared according to the invention were compared with commercially available quinacridone pigments. For example, 2,9-dichloroquinacridone was compared to QUINDO® Magenta RV-6843 (available from Miles Inc.), 2,9-dimethylquinacridone was compared to QUINDO® Magenta RV-6832 (available from Miles Inc.), and the solid solution of Example 3 was compared to QUINDO® Magenta RV-6853 (available from Miles Inc.).

Dispersibility in PVC was evaluated by comparing hot-milled and cold-milled color development according to the following procedure. For each sample tested, a 50 g portion of flexible PVC was added to a hot (155° C.) two-roll mill having a nip thickness of 25 mils (ca. 0.6 mm) and fluxed until uniform. A 0.050 g portion of the test pigment or comparison pigment was sprinkled into the nip over a period of about ten seconds, after which the fluxed material was cut and rolled on the mill for five minutes. The pigmented sheet was then removed from the mill and placed on a clean flat surface to cool. A piece cut from the resultant sheet and allowed to cool to room temperature was used as the "hot-milled" sample for evaluation. A sample cut from the same sheet while still warm was placed on a cold (24° C.) two-roll mill having a nip thickness 21 mils (ca. 0.5 mm), then folded and passed through the mill seven times. The cold-rolled sheet was again fluxed in the hot mill until smooth. A sample cut from the resultant sheet was used as the "cold-milled" sample for evaluation. Color development was evaluated using a scale of 1 to 5 based on the difference between hot-milled and cold-milled color development, where 1 represents poor dispersibility (as evidenced by extreme differences in color development) and 5 represents excellent dispersibility (as evidenced by essentially no difference in color development).

Dispersibilities in the plastisol were evaluated by hand-mixing 15 mg of the test pigment or comparison pigment with 3000 mg of the plastisol, drawing down the resultant dispersion on a paper-backed foil to form a uniform film, and oven-curing the film. Dispersibility was evaluated using a scale of 1 to 5, where 1 represents a failure of the test sample to develop color and 5 represents extremely good color development.

EXAMPLE 1

Crude 2,9-dichloroquinacridone presscake (82.6 g, corresponding to 20 g of 100% strength pigment) was slurried in 220 g of water and 20 g of methyl benzoate (solvent to pigment ratio of 1.0:1). The slurry was heated at 85° to 90° C. for 8 hours in a laboratory Parr reactor. The methyl benzoate was then hydrolyzed with 30 g of 50% aqueous sodium hydroxide at 8° to 90° C. for 2 hours. The resultant slurry was filtered and the product isolated to yield a magenta (i.e., red-violet) pigment having good dispersibility in PVC, as shown in Table 1.

TABLE 1

| Dispersibility in PVC | |
|---|---|
| Test sample | Dispersibility |
| Example 1 | 2–3 |
| QUINDO Magenta RV-6843 | 1–2 |

EXAMPLE 2

Crude 2,9-dimethylquinacridone presscake (174.3 g, corresponding to 30 g of 100% strength pigment) was slurried in 180 g of water and 24 g of methyl benzoate (solvent to pigment ratio of 0.8:1). The slurry was heated at 140° to 145° C. for 8 hours in a laboratory Parr reactor. The methyl benzoate was then hydrolyzed with 36 g of 50% aqueous sodium hydroxide at 85° to 90° C. for 2 hours. After filtration, the presscake was dried and ground to give a magenta pigment having good dispersibility in PVC, as shown in Table 2.

TABLE 2

| Dispersibility in PVC | |
|---|---|
| Test sample | Dispersibility |
| Example 2 | 2–3 |
| QUINDO Magenta RV-6832 | 1–2 |

EXAMPLE 3

A solid solution presscake of 2,9-dichloroquinacridone and quinacridone (80:20 ratio by weight; 105.3 g, corresponding to 20 g of 100% strength pigment) was slurried in 240 g of water and 20 g of methyl benzoate (solvent to pigment ratio of 1.0:1) and heated at 85° to 90° C. for 8 hours. The methyl benzoate was then hydrolyzed with 30 g of 50% aqueous sodium hydroxide at 85° to 90° C. for 2 hours. The slurry was then filtered and the presscake dried to yield a magenta pigment having very good dispersibility in the plastisol described above, as shown in Table 3.

TABLE 3

| Dispersibility in the plastisol | |
|---|---|
| Test sample | Dispersibility |
| Example 3 | 4–5 |
| QUINDO Magenta RV-6853 | 4 |

EXAMPLE 4

Crude 2,9-dichloroquinacridone presscake (97.4 g, corresponding to 30 g of 100% strength pigment) was slurried in 180 g of water and 18 g of methyl salicylate (solvent to pigment ratio of 0.6:1). The slurry was heated at 140° to 145° C. for 8 hours. The methyl salicylate was then hydrolyzed with 30 g of 50% aqueous sodium hydroxide at 85° to 90° C. for 2 hours. The slurry was filtered and the product isolated to give a very opaque magenta pigment having very good dispersibility in the plastisol described above, as shown in Table 4.

TABLE 4

| Dispersibility in the plastisol | |
|---|---|
| Test sample | Dispersibility |
| Example 4 | 4–5 |
| QUINDO Magenta RV-6843 | 1–2 |

EXAMPLE 5

Example 1 was repeated except for using 28.9 g of dimethyl phthalate instead of methyl benzoate (solvent to pigment ratio of 1.45:1) and 43.0 g of 50% aqueous sodium hydroxide for the hydrolysis, yielding a magenta 2,9-dichloroquinacridone pigment.

EXAMPLE 6

Crude quinacridone presscake (128.9 g, corresponding to 30 g of 100% strength pigment) was slurried in 240 g of water and 30 g of methyl benzoate (solvent to pigment ratio of 1.0:1). The slurry was heated at 140° to 145° C. for 8 hours. The methyl benzoate was then hydrolyzed with 39 g of 50% aqueous sodium hydroxide at 85° to 90° C. for 2 hours. The resultant slurry was filtered and the product isolated to yield a violet quinacridone pigment.

EXAMPLE 7

A solid solution presscake of 2,9-dichloroquinacridone and 2,9-dimethoxyquinacridone (25:75 ratio by weight; 84.7 g, corresponding to 26 g of 100% strength pigment) was slurried in 286 g of water to obtain a uniform slurry. Dimethyl phthalate (32 g) was added (solvent to pigment ratio of 1.23:1) and the resultant slurry was heated at 115° to 120° C. for 8 hours. The dimethyl phthalate was then hydrolyzed with 47 g of 50% aqueous sodium hydroxide at 85 to 90° C. The slurry was then filtered and the product dried to yield an intense blue-violet pigment.

EXAMPLE 8

Crude 2,9-dichloroquinacridone presscake (82.6 g, corresponding to 20 g of 100% strength pigment) was slurried in 211.5 g of water and 50 g of methyl benzoate (solvent to pigment ratio of 2.5:1). The slurry was heated at 85° to 90° C. for 8 hours. The methyl benzoate was then hydrolyzed with 75 g of 50% aqueous sodium hydroxide at 85° to 90° C. for 2 hours. The resultant slurry was filtered and the product isolated to yield a magenta pigment having good dispersibility in the plastisol, as shown in Table 5.

TABLE 5

| Dispersibility in the plastisol | |
|---|---|
| Test sample | Dispersibility |
| Example 8 | 4 |
| QUINDO Magenta RV-6843 | 1–2 |

EXAMPLES 9–12

Applications

The preparation of various pigmented materials is described in application Examples 9–12.

EXAMPLE 9

Preparation of enamel paints

A finely divided 8 g sample of the 2,9-dichloroquinacridone pigment of Example 1 is dispersed in 92 g of a stoving enamel having the following composition:

33% alkyd resin (AROPLAZ® 1453-X-50 alkyd resin, Reichhold Chemicals, Inc., White Plains, N.Y.)

15% melamine resin (e.g., RESIMENE® BM-7507 melamine resin, Monsanto Company, St. Louis, Mo.)

5% glycol monomethyl ester

34% xylene

13% butanol

Upon completion of the dispersion the pigmented paint is applied to metal foils and then baked at 130° C. for 30 minutes, giving a magenta (i.e., red-violet) coating.

Other suitable alkyd resins are products based on synthetic or vegetable fatty acids, such as coconut oil, castor oil, recinene oil, linseed oil, or the like. Urea resins can be used instead of melamine resins.

EXAMPLE 10

Preparation of a thermoplastic film

A 0.1 g sample of the 2,9-dichloroquinacridone pigment of Example 1 was dispersed in 65 g of stabilized polyvinyl chloride and 35 g of diisooctyl phthalate at 160° C. in a mixing mill. A magenta film having very good light and migration fastness was obtained. The pigment of Example 1 showed excellent dispersibility properties.

A magenta film was similarly prepared using the 2,9-dimethylquinacridone pigment of Example 2. The pigment showed good color and strength and good dispersibility in plastics.

Synthetic polyamides of caprolactam or of adipic acid and hexamethylenediamine or the polyester condensates of terephthalic acid and ethylene glycol can be colored in a similar manner at 280° to 300° C. (in an atmosphere of nitrogen where necessary).

EXAMPLE 11

Preparation of a printing ink

A printing ink is prepared by grinding 35 g of the pigment of Example 1, 65 g of linseed oil, and 1 g of a siccative (cobalt naphthenate, 50% strength in white spirit). When used for offset printing on paper, the printing ink gives magenta offset prints.

EXAMPLE 12

Preparation of a metallic paint

A mixture of 6 g of the pigment of Example 1 in 12 g of xylene, 4.1 g of butyl acetate, 0.7 g of butanol, and 22.5 g of a 20% solution of cellulose acetobutyrate in 2:1 butyl acetate/xylene is dispersed by agitating for 30 minutes in a shaker containing 2 to 3 mm diameter glass beads. To this dispersion is then added 10 g of a saturated polyester resin (available as DYNAPOL® H 700 from Huls America), 7.3 g of melamine resin, 8.7 g of a 20% solution of cellulose acetobutyrate in 2:1 butyl acetate/xylene, 18 g of butyl acetate, 1.6 g of butanol, and 9.7 g of xylene and shaking is continued for another 5 minutes.

Metallic paints are then prepared by adding a dispersion of aluminum paste (60% solids; available as SPARKLE SILVER® AR from Silberline Manufacturing Co., Inc.) in xylene (about 1:2) in amounts such that the ratio of pigment to aluminum is between about 80:12 and 1:99. These metallic paints are then applied to panels and after drying are coated with a clearcoat based on an acrylate/melamine resin (which can contain additional additives, such as ultraviolet absorbers) to give a brilliant magenta metallic paint.

What is claimed is:

1. A process for conditioning a quinacridone pigment comprising
   (a) preparing an aqueous slurry of a crude quinacridone;
   (b) thoroughly mixing the aqueous slurry with 0.3 to 2.9 parts by weight, relative to the quinacridone pigment, of at least one $C_1$–$C_{12}$ alkyl ester of a $C_7$–$C_{12}$ aromatic carboxylic acid at a temperature of between 70° C. and 200° C.;
   (c) hydrolyzing the alkyl ester used in step (b) in alkaline media; and
   (d) collecting the quinacridone pigment.

2. A process according to claim 1 wherein the quinacridone is 2,9-dichloroquinacridone or 2,9-dimethylquinacridone.

3. A process according to claim 1 wherein the quinacridone is a solid solution of unsubstituted quinacridone and a quinacridone derivative or a solid solution of two quinacridone derivatives.

4. A process according to claim 3 wherein the solid solution is a composition containing 99 to 1 percent by weight of 2,9dichloroquinacridone and 1 to 99 percent by weight of unsubstituted quinacridone.

5. A process according to claim 3 wherein the solid solution is a composition containing 80 to 50 percent by weight of 2,9dichloroquinacridone and 20 to 50 percent by weight of unsubstituted quinacridone.

6. A process according to claim 1 wherein the crude quinacridone is used as presscake containing 4 to 70 percent by weight quinacridone pigment, with the balance being essentially water.

7. A process according to claim 1 wherein the crude quinacridone is used as presscake containing 4 to 40 percent by weight quinacridone pigment, with the balance being essentially water.

8. A process according to claim 1 wherein the particle size of the crude quinacridone is altered before the aqueous slurry is prepared.

9. A process according to claim 1 wherein the crude quinacridone is slurried in step (a) with 4 to 20 pads by weight of water relative to the amount of quinacridone pigment, said amount of water including any water already present in the crude quinacridone.

10. A process according to claim 1 wherein the ester is methyl benzoate, dimethyl phthalate, or methyl salicylate, or a mixture thereof.

11. A process according to claim 1 wherein 0.5 to 2.5 pads by weight, relative to the quinacridone, of the ester is used in step (b).

12. A process according to claim 1 wherein 0.5 to 1.5 pads by weight, relative to the quinacridone, of the ester is used in step (b).

13. A process according to claim 1 wherein step (b) is carried out at a temperature of 80° C. to 140° C.

14. A process according to claim 1 wherein step (b) is carried out for two to twenty hours.

15. A process according to claim 1 wherein step (b) is carried out for four to eight hours.

16. A process according to claim 1 wherein the alkyl ester is hydrolyzed in step (c) with a strongly alkaline solution.

17. A process according to claim 1 wherein the alkyl ester is hydrolyzed in step (c) with 4 to 10% aqueous sodium hydroxide heated at 85° C. for two hours.

18. A process according to claim 1 wherein the quinacridone pigment is collected by filtration.

19. A quinacridone pigment conditioned by the process of claim 1.

20. A colored macromolecular material containing a colorant wherein said colorant comprises a quinacridone pigment conditioned by the process of claim 1.

21. A printing ink containing a colorant wherein said colorant comprises a quinacridone pigment conditioned by the process of claim 1.

22. A paint containing a colorant wherein said colorant comprises a quinacridone pigment conditioned by the process of claim 1.

* * * * *